(12) United States Patent
Elkins et al.

(10) Patent No.: US 9,715,283 B2
(45) Date of Patent: Jul. 25, 2017

(54) METHOD AND APPARATUS FOR GESTURE DETECTION IN AN ELECTRONIC DEVICE

(71) Applicant: Motorola Mobility LLC, Chicago, IL (US)

(72) Inventors: Mark Elkins, Ontario (CA); John Gorsica, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 80 days.

(21) Appl. No.: 14/631,925

(22) Filed: Feb. 26, 2015

(65) Prior Publication Data

US 2016/0252963 A1 Sep. 1, 2016

(51) Int. Cl.
G06F 3/038 (2013.01)
G06F 3/01 (2006.01)
G06F 1/16 (2006.01)
G06F 3/16 (2006.01)

(52) U.S. Cl.
CPC ............ *G06F 3/017* (2013.01); *G06F 1/1694* (2013.01); *G06F 3/167* (2013.01)

(58) Field of Classification Search
CPC ................................ G06F 3/016; G06F 3/011
USPC ........................................................ 345/156
See application file for complete search history.

(56) References Cited

U.S. PATENT DOCUMENTS

| 8,170,621 | B1 | 5/2012 | Lockwood | |
| 2007/0082717 | A1* | 4/2007 | Lee | H04M 1/6058 455/575.2 |
| 2008/0014989 | A1 | 1/2008 | Sandegard et al. | |
| 2011/0128350 | A1 | 6/2011 | Oliver et al. | |
| 2012/0086629 | A1* | 4/2012 | Thorn | G06F 3/0482 345/156 |
| 2012/0306770 | A1* | 12/2012 | Moore | G06F 3/01 345/173 |
| 2013/0050139 | A1* | 2/2013 | Gute | G06F 1/1626 345/174 |

(Continued)

FOREIGN PATENT DOCUMENTS

WO WO2012/166277 12/2012

OTHER PUBLICATIONS

Application No. GB1603199.9; Great Britain Search Report; Mailed Aug. 16, 2016.

(Continued)

*Primary Examiner* — Towfiq Elahi
(74) *Attorney, Agent, or Firm* — Philip H. Burrus, IV

(57) ABSTRACT

An electronic device includes one or more processors, a motion detector, another motion detector, such as a gyroscope or one or more accelerometers, and one or more proximity detectors. An amount of movement of the electronic device, an amount of rotation about an axis, and whether an object is proximately located with a major face of the electronic device can be determined. A gesture lifting the electronic device occurring can be confirmed when the amount of movement exceeds a first predetermined threshold, the amount of rotation exceeds a second predetermined threshold, and the object is proximately located with the electronic device. Other factors, such as whether the motion was against a gravity direction and a final orientation of the electronic device can be considered as well. A control operation can occur in response to confirming the gesture.

20 Claims, 9 Drawing Sheets

(56) References Cited

U.S. PATENT DOCUMENTS

| | | |
|---|---|---|
| 2014/0278443 A1 | 9/2014 | Gunn et al. |
| 2014/0282270 A1 | 9/2014 | Slonneger |
| 2015/0006172 A1 | 1/2015 | Alameh |
| 2015/0022439 A1 | 1/2015 | Alameh et al. |
| 2015/0205946 A1* | 7/2015 | Aurongzeb ............. G06F 3/017 726/19 |

OTHER PUBLICATIONS

Microsoft Lumia, Dec. 12, 2014, Gesture Beta—Use enhanced interaction your Lumia phone, Youtube, Available from: https://www.youtube.com/watch?v=9YGvfLjje_s, Accessed on the Aug. 9, 2016.

Howcast, Jan. 10, 2014, Use Siri w/out Pressing the Home Button, iPhone Tipes, Youtube, Available from: https://www.youtube.com/watch?v=W5ap7uaY-OM, accessed Aug. 9, 2016.

* cited by examiner

METHOD AND APPARATUS FOR GESTURE DETECTION IN AN ELECTRONIC DEVICE

BACKGROUND

Technical Field

This disclosure relates generally to electronic devices and corresponding methods, and more particularly to electronic devices with motion sensors.

Background Art

Mobile electronic communication devices, such as mobile telephones, smart phones, gaming devices, and the like, are used by billions of people. These owners use mobile communication devices for many different purposes including, but not limited to, voice communications and data communications for text messaging, Internet browsing, commerce such as banking, and social networking.

As the technology of these devices has advanced, so too has their feature set. For example, not too long ago all electronic devices had physical keypads. Today touch sensitive displays are more frequently seen as user interface devices. Similarly, it used to be that the only way to deliver user input to a device was with touch, either through a keypad or touch sensitive display. Today some devices are equipped with voice recognition that allows a user to speak commands to a device instead of typing them.

Some electronic devices even include motion sensors that can recognize certain movements of a user. For example, accelerometers in some electronic devices can detect a rhythmic up-down and side-to-side motion so as to be used as a pedometer. These electronic devices can count these rhythmic motions to determine a number of steps a user has taken.

While these motion sensors are useful for simple tasks like counting a user's steps, their use has been limited due to the fact that it is frequently very difficult for such devices to identify what gesture a user is making. This is true even when the motion sensors detect that a gesture is occurring.

It would be advantageous to have additional solutions, in the form of an improved apparatus, an improved method, or both, to be able to more accurately identify gestures resulting in motion of electronic devices.

Figure 1:
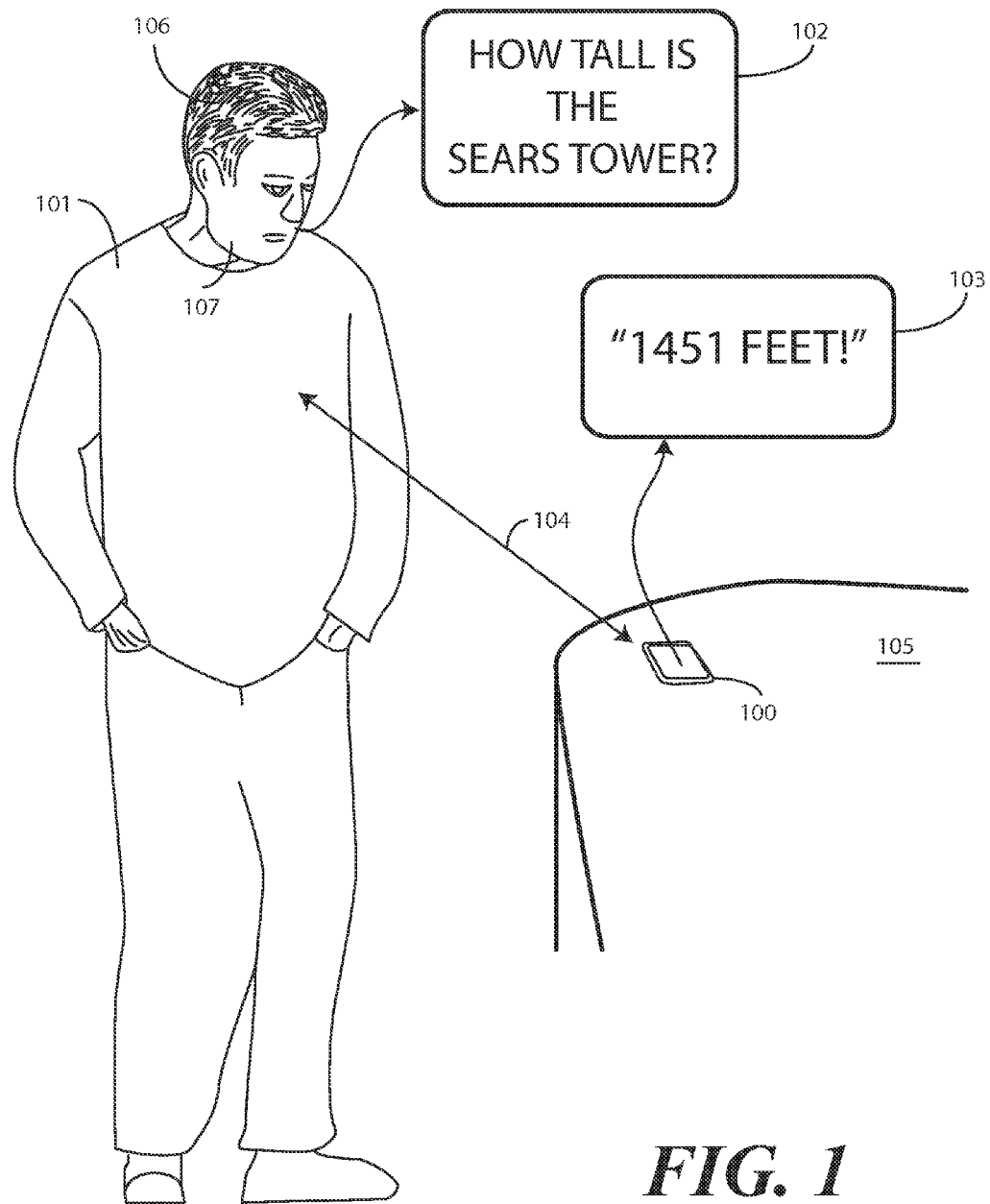
FIG. 1 illustrates a user interacting with a prior art electronic device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting a lifting gesture that moves an electronic device from a first elevation to a second elevation adjacent to a user's face or head. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of detecting a gesture lifting an electronic device has occurred, and optionally executing one or more control operations in response, as described herein. The non-processor circuits may include, but are not limited to, microphones, loudspeakers, acoustic amplifiers, digital to analog converters, signal drivers, clock circuits, power source circuits, and user input devices. As such, these functions may be interpreted as steps of a method to perform the detection of the gesture lifting the device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an accurate and repeatable method and apparatus for detecting that a gesture lifting an electronic device has occurred. For example, when a user lifts a portable electronic device from their waist to their ear, as if making a telephone call, embodiments of the disclosure can quickly and accurately determine this motion so that the device can perform one or more control operations in response to detecting the motion. Embodiments of the disclosure are further capable of distinguishing this lifting motion from other motions, such as placement of a portable electronic device in a pocket, which can have very similar motion signatures. Advantageously, embodiments of the disclosure provide a natural, immediate, and intuitive manner of controlling an electronic device without the need to deliver voice commands or touch input to a user interface. With embodiments of the disclosure, a user can trigger, activate, actuate, or initiate control functions of an electronic device with a simple gesture motion.

In one embodiment, a method of controlling an electronic device comprises detecting, with one or more motion sensors, a gesture lifting the electronic device has occurred. This determination can be a function of one or more factors. Explanatory factors include a distance that the electronic device moves during a movement initiated by a user, an amount of rotation of the electronic device about an axis during the movement, and whether a surface of the electronic device ends up proximately located with another object, such as a user's head, ear, or face. Other explanatory factors include whether some of the movement was against a direction of gravity, an orientation of the electronic device at the end of the movement, and an acceleration occurring during the movement. These factors can be used individually or in combination.

In one embodiment, once a gesture lifting an electronic device to a user's ear, face, or head is detected, one or more control circuits operable with the one or more motion sensors can perform a control operation. For example, for illustrative purposes an explanatory use case will be transforming a portable electronic device from a normal mode of operation to a discreet mode of operation. However, this use case is provided solely for explaining one or more embodiments. Other control operations could be substituted for the mode change, as numerous control operations will be obvious to those of ordinary skill in the art having the benefit of this disclosure.

In the explanatory use case, the control operation will be transitioning a voice control interface engine operating in an electronic device between a normal mode of operation and a discrete mode of operation. In this example, a voice control interface engine is operable to receive voice commands and deliver audible responses to a user. For instance, the voice control interface engine can receive a speech command in which a user asks a question. The electronic device may then search the Internet for the answer and, in response to receiving the speech command, deliver an audible output to the user with the answer.

Embodiments of the disclosure contemplate that one unforeseen consequence of this explanatory voice recognition system is that a user may not want passersby to hear the audible output. This is especially true when the audible output includes an enunciation of personal information. With this unforeseen problem in mind, methods and apparatuses for detecting the gesture lifting the electronic device can be used to trigger or activate a control operation such as causing the voice control interface engine to inter a second, "discrete" mode of operation. This explanatory use case, which is a suitable application for one or more embodiments of the disclosure, will be illustrated in the figures that follow.

Turning now to FIG. 1, illustrated therein is a prior art electronic device 100 configured with a voice controlled user interface. One example of such a prior art electronic device 100 is described US Published Patent Application No. 2014/0278443 to Gunn et al., which is incorporated herein by reference. Essentially, the prior art electronic device 100 includes a voice controlled user interface to receive a speech command phrase, identify a speech command phrase segment, and perform a control operation in response to the segment. In one embodiment, the control operation is the delivery of an audible response.

FIG. 1 illustrates a use case that highlights an unforeseen problem associated with the otherwise incredibly convenient functionality offered by the voice controlled user interface. A user 101 delivers, in a normal conversational tone, a voice command 102 that asks, "How tall is the Sears Tower?" The prior art electronic device 100, using its voice controlled user interface and one or more other applications, retrieves the answer from a remote source and announces the answer with an audible output 103. In this case, the prior art electronic device announces, at a volume level sufficient for the user 101 to hear it from several feet away, "Fourteen hundred and fifty one feet."

Two things are of note in FIG. 1. First, due to the convenience offered by the voice controlled user interface, the user 101 has been able to determine a trivia fact simply by speaking. The user 101 did not have to access a book, computer, or other person. The prior art electronic device 100 simply found the answer and delivered it.

Second, the audible output 103 was delivered at an output level that was sufficient for the user 101 to hear it from a distance away. It is interesting to note that if the user 101 was able to hear it from a few feet away, so too would a passerby or eavesdropper. Embodiments of the disclosure contemplate that the user 101 may not care if a third party listens in on the answer to the question, "How tall is the Sears Tower?" However, if the user's voice command had been "play me my voice mail," the user 101 may not want a third party to hear their doctor giving a medical diagnosis. Similarly, the user 101 may not want a third party to hear their significant other breaking up with them or using expletives after they forgot an anniversary.

Advantageously, one or more embodiments of the disclosure can allow the user 101 to conveniently cause an electronic device configured in accordance with embodiments of the disclosure to perform a control operation, such as entering a discreet mode of operation, without drawing attention to themselves and without delivering either touch input or voice input. Accordingly, the user 101 can use the lift detection method and apparatus described herein to transition a voice control interface engine into a second, discrete mode of operation where the medical diagnosis, breakup, or expletives are heard only by the person for whom they were intended. As noted above, this is but one explanatory application for embodiments of the disclosure. Others will be readily obvious to those of ordinary skill in the art having the benefit of this disclosure.

Figure 2:
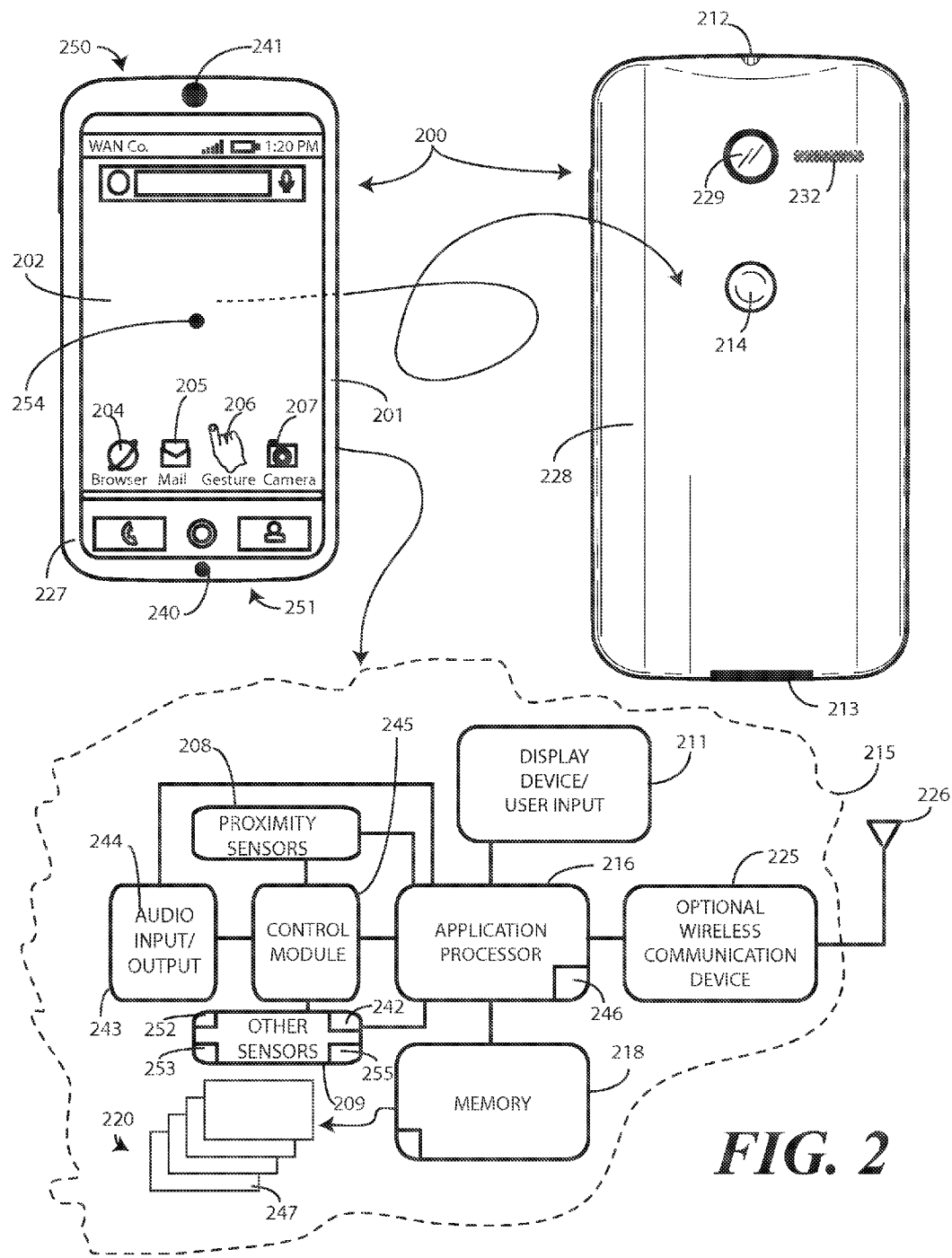
FIG. 2 illustrates a schematic block diagram of one explanatory electronic device in accordance with one or more embodiments of the disclosure.

Turning now to FIG. 2, illustrated therein is one explanatory electronic device 200 configured in accordance with one or more embodiments of the disclosure. The electronic device 200 of FIG. 2 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 200 could equally be a palm-top computer, a tablet computer, a gaming device, a media player, or other device.

This illustrative electronic device 200 includes a display 202, which may optionally be touch-sensitive. In one embodiment where the display 202 is touch-sensitive, the display 202 can serve as a primary user interface 211 of the electronic device 200. Users can deliver user input to the display 202 of such an embodiment by delivering touch input from a finger, stylus, or other objects disposed proximately with the display. In one embodiment, the display 202 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 includes a housing 201. In one embodiment, the housing 201 includes two housing members. A front housing member 227 is disposed about the periphery of the display 202 in one embodiment. The front housing member 227 and the display 202 define, collectively, a first major face of the electronic device 200. A rear-housing member 228 forms the backside of the electronic device 200 in this illustrative embodiment and defines a second, rear major face of the electronic device.

Features can be incorporated into the housing members 227,228. Examples of such features include an optional camera 229 or an optional speaker port 232 disposed atop a loudspeaker. These features are shown being disposed on the rear major face of the electronic device 200 in this embodiment, but could be located elsewhere. In this illustrative embodiment, a user interface component 214, which may be a button or touch sensitive surface, can also be disposed along the rear-housing member 228.

In one embodiment, the electronic device 200 includes one or more connectors 212,213, which can include an analog connector, a digital connector, or combinations thereof. In this illustrative embodiment, connector 212 is an analog connector disposed on a first end 250, i.e., the top end, of the electronic device 200, while connector 213 is a digital connector disposed on a second end 251 opposite the first end 250, which is the bottom end in this embodiment.

A block diagram schematic 215 of the electronic device 200 is also shown in FIG. 2. In one embodiment, the electronic device 200 includes one or more processors 216. In one embodiment, the one or more processors 216 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 200. Each of the application processor and the auxiliary processor(s) can be configured to process and execute executable software code to perform the various functions of the electronic device 200. A storage device, such as memory 218, can optionally store the executable software code used by the one or more processors 216 during operation.

In this illustrative embodiment, the electronic device 200 also includes a communication circuit 225 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 225 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 225 can include wireless communication circuitry, one of a receiver, a transmitter, or transceiver, and one or more antennas 226.

In one embodiment, the one or more processors 216 can be responsible for performing the primary functions of the electronic device 200. For example, in one embodiment the one or more processors 216 comprise one or more circuits operable with one or more user interface devices 211, which can include the display 202, to present presentation information to a user. The executable software code used by the one or more processors 216 can be configured as one or more modules 220 that are operable with the one or more processors 216. Such modules 220 can store instructions, control algorithms, logic steps, and so forth.

In one embodiment, one or more proximity sensors 208 can be operable with the one or more processors 216. In one embodiment, the one or more proximity sensors 208 include one or more signal receivers and signal transmitters. The signal transmitters emit electromagnetic or infrared signals that reflect off of objects to the signal receivers, thereby detecting an object proximately located with the electronic device 200. It should be noted that each of the proximity sensors 208 can be any one of various types of proximity sensors, such as but not limited to, capacitive, magnetic, inductive, optical/photoelectric, laser, acoustic/sonic, radar-based, Doppler-based, thermal, and radiation-based proximity sensors. Other types of sensors will be obvious to those of ordinary skill in the art.

In one embodiment, one or more proximity sensors 208 can be infrared proximity sensors that transmit a beam of infrared light that reflects from a nearby object and is received by a corresponding signal receiver. The proximity sensors 208 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the electronic device 200.

In one embodiment, the one or more processors 216 may generate commands or execute control operations based on information received from one or more proximity sensors 208. The one or more processors 216 may also generate commands or execute control operations based upon information received from a combination of the one or more proximity sensors 208 and one or more other sensors 209. Alternatively, the one or more processors 216 can generate commands or execute control operations based upon information received from the one or more other sensors 209 alone. Moreover, the one or more processors 216 may process the received information alone or in combination with other data, such as the information stored in the memory 218.

The one or more other sensors 209 may include a microphone 240, an earpiece speaker 241, a second loudspeaker (disposed beneath speaker port 232), and a mechanical input component 214 such as button. The one or more other sensors 209 may also include key selection sensors, a touch pad sensor, a touch screen sensor, a capacitive sensor, and one or more switches. Touch sensors may used to indicate whether any of the user actuation targets 204,205,206,207 on present on the display 202 are being actuated. Alternatively, touch sensors in the housing 201 can be used to determine whether the electronic device 200 is being touched at side edges, thus indicating whether certain orientations or movements of the electronic device 200 are being performed by a user. The other sensors 209 can also include surface/housing capacitive sensors, audio sensors, and video sensors (such as a camera).

The other sensors 209 can also include motion detectors 242, such as one or more accelerometers 252 or gyroscopes 253. For example, an accelerometer 252 may be embedded in the electronic circuitry of the electronic device 200 to show vertical orientation, constant tilt and/or whether the device is stationary. A gyroscope 253 can be used in a similar fashion.

In one or more embodiments, the motion detectors 242 can also include a barometer 255. A barometer 255 can sense changes in air pressure due to elevation changes. Accordingly, during a gesture lifting the electronic device 200, a barometer can be used to estimate the distance the electronic device 200 has moved by detecting changes in pressure from a starting position to a stopped position. In one embodiment, the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

Regardless of the type of motion detectors 242 that are used, in one embodiment the motion detectors 242 are also operable to detect movement of the electronic device 200 by a user. In one or more embodiments, the other sensors 209 and the motion detectors 242 can each be used as a gesture detection system.

Illustrating by example, in one embodiment a user can deliver gesture input by moving a hand or arm in predefined motions in close proximity to the electronic device 200. Such a motion can be detected by the one or more proximity sensors 208. In another embodiment, the user can deliver gesture input by touching the display 202. This user input can be detected by touch sensors operable with the display. In yet another embodiment, a user can deliver gesture input by lifting, shaking, or otherwise deliberately moving the electronic device 200. This motion can be detected by the one or more accelerometers 252. In yet other embodiments, the user can deliver gesture input by rotating or changing the orientation of the electronic device 200, which can be detected by multiple accelerometers 252 or a gyroscope 253. Other modes of delivering gesture input will be obvious to those of ordinary skill in the art having the benefit of this disclosure.

Other components operable with the one or more processors 216 can include output components 243 such as video outputs, audio outputs 244, and/or mechanical outputs. Examples of output components include audio outputs 244 such as speaker port 232, earpiece speaker 241, or other alarms and/or buzzers and/or a mechanical output component such as vibrating or motion-based mechanisms.

In one embodiment, the one or more processors 216 are operable to change a gain on the microphone 240 such that voice input from a user can be received from different distances. For example, in one embodiment the one or more processors 216 are operable to operate the microphone 240 in a first mode at a first gain sensitivity so that voice commands from a user can be received from more than one foot away from the device. If the electronic device 200 is a smartphone, for instance, the one or more processors 216 may operate the microphone 240 in a first mode at a first gain sensitivity to receive voice input from a user when operating in a speakerphone mode for example. Similarly, when the electronic device 200 is configured with a control module 245, which is a voice control interface engine in this illustrative example, the one or more processors 216 may operate the microphone 240 in a first mode at a first gain sensitivity to receive voice input from a user several feet away. This would cause the microphone 240 to function as did the microphone of prior art electronic device (100) of FIG. 1 in which voice commands (102) could be received from several feet away.

In one embodiment, the one or more processors 216 may further operate the microphone 240 in a second mode at a second gain sensitivity to receive voice input from a user. In one embodiment, the second gain sensitivity is less than the first gain sensitivity. This results in voice input being received from closer distances at lower levels. If the electronic device 200 is a smartphone, for instance, the one or more processors 216 may operate the microphone 240 in a second mode at a second gain sensitivity to receive voice input from a user when the electronic device 200 is placed against the user's face. As the microphone 240 is very close to the user's mouth, this second, lesser gain sensitivity can be used to capture lower volume voice input from the user. Similarly, when the electronic device 200 is configured with a control module 245 like a voice control interface engine, the one or more processors 216 may operate the microphone 240 in a second mode at a second gain sensitivity to receive voice input from a user's mouth that may be only an inch (or less) from the microphone 240.

In a similar fashion, the one or more processors 216 can operate one or both of the earpiece speaker 241 and/or the loudspeaker under speaker port 232 in either a first mode or a second mode. In one embodiment, the one or more processors 216 are operable to change a gain of either speaker such that audible output from the electronic device 200 can be heard by a user at different distances. For example, in one embodiment the one or more processors 216 are operable to operate one or both of the earpiece speaker 241 and/or the loudspeaker under speaker port 232 in a first mode at a first gain so that audible output is produced at a first output level. In one embodiment, the first output level is a volume sufficient that the audible output can be heard from more than one foot away from the device. If the electronic device 200 is a smartphone, for instance, the one or more processors 216 may operate one or both of the earpiece speaker 241 and/or the loudspeaker under speaker port 232 in a first mode at a first gain to produce output at a louder volume when operating in a speakerphone mode for example. Similarly, when the electronic device 200 is configured with a control module 245 like a voice control interface engine, the one or more processors 216 may operate the one or both of the earpiece speaker 241 and/or the loudspeaker under speaker port 232 in a first mode at a first gain to produce audible output at a first output level so that a user can hear the audible output from a user several feet away. This would cause the one or both of the earpiece speaker 241 and/or the loudspeaker under speaker port 232 to function as did the loudspeaker of prior art electronic device (100) of FIG. 1 in which audible output (103) could be heard from several feet away.

In one embodiment, the one or more processors 216 may further operate the one or both of the earpiece speaker 241 and/or the loudspeaker under speaker port 232 in a second mode at a second gain to produce audible output at a second output level. In one embodiment, the second gain is less than the first gain such that the second output level is at a lower volume than the first output level. This results in audible output only being audible from closer distances due to the lower output levels. If the electronic device 200 is a smartphone, for instance, the one or more processors 216 may operate the one or both of the earpiece speaker 241 and/or the loudspeaker under speaker port 232 in a second mode at a second gain to deliver audible output to a user when the electronic device 200 is placed against the user's face. As the earpiece speaker 241 is very close to the user's ear, this second, lesser gain can be used to deliver audible output at a lower level so as not to overdrive the user's eardrums. Similarly, when the electronic device 200 is configured with a control module 245 like the illustrative voice control interface engine, the one or more processors 216 may operate one or both of the earpiece speaker 241 and/or the loudspeaker under speaker port 232 in a second mode at a second gain to deliver audible output to a user's ear when the earpiece speaker 241 is only an inch (or less) from the earpiece speaker 241. In one embodiment, this second mode of operation, i.e., where the second output level is less than the first output level, is known as the "discrete mode" of operation.

In one embodiment, the one or more processors 216 are to switch between the earpiece speaker 241 and the loudspeaker under speaker port 232 when operating in the first mode and the second mode. For example, the earpiece speaker 241 may comprise a small driver to deliver audible output only a few millimeters. By contrast, the loudspeaker under speaker port 232 may be a large driver to deliver audible output across larger distances. Where this is the case, when operating in the first mode the one or more processors 216 may deliver all audio output from speaker port 232. When operating in the second mode, the one or more processors 216 may deliver all audible output from the earpiece speaker 241. Accordingly, in one or more embodiments a control operation comprises switching a control module 245 between a first mode of operation and a second mode of operation. Where the control module 245 is the voice control interface engine used here as an illustration, this voice control engine can be operative in the second mode to output the audible output from a second loudspeaker, e.g., earpiece speaker 241, that is different from the loudspeaker operable in the first mode, e.g., speaker port 232.

In one embodiment, the output components 243 may include analog-to-digital converters (ADCs), digital-to-analog converters (DACs), echo cancellation, high-pass filters, low-pass filters, band-pass filters, adjustable band filters, noise reduction filtering, automatic gain control (AGC) and other audio processing that may be applied to filter noise from audio. For example, these devices may be used to filter noise received from the microphone 240. The output components 243 may be a single component as shown in FIG. 2 or may be implemented partly in hardware and partly in software or firmware executed by one or more processors 216. In some embodiments, the output components 243 may be implemented using several hardware components and may also utilize one or more software or firmware components in various combinations. The output components 243 may be operative to control one or both of the earpiece speaker 241 and/or the loudspeaker under speaker port 232, and/or to selectively turn these output devices ON or OFF. Additionally, the output components 243 can adjust filtering or gain of one or both of the earpiece speaker 241 and/or the loudspeaker under speaker port 232 for purposes of various applications described below.

In one or more embodiments, the one or more processors 216 are operable to detect a gesture lifting the electronic device 200. In one embodiment, the accelerometer 252 serves as a motion detector operable with the one or more processors 216. A gyroscope 253 then serves as another motion detector operable with the one or more processors 216. Where a gyroscope 253 is not included with the electronic device 200, multiple accelerometers can substitute for the gyroscope 253 to determine rotation of the electronic device 200 about the axis. In such an embodiment, the accelerometer 252 would serve as the motion detector while the accelerometer 252 and another accelerometer substitute for the gyroscope 253. This results in the other motion detector having an accelerometer 252 in common with the motion detector.

In one embodiment, when a user lifts or otherwise moves the electronic device 200, the one or more processors 216 are operable to determine an amount of movement of the electronic device 200 from the motion detector, which is the accelerometer 252 in one embodiment. The one or more processors 216 are further configured to determine an amount of rotation of the electronic device 200 about an axis 254 from the other motion detector, which is the gyroscope 253 in one embodiment. In one embodiment, the axis 254 is running perpendicular to the front major face of the electronic device 200 defined by the display 202 and front housing member 227 in FIG. 2. Said differently, in this embodiment the axis 254 runs orthogonally into, and out of, the page as viewed in FIG. 2. The axis 254 is thus shown as a dot to represent this orientation.

In one embodiment, the one or more processors 216 are further operable to determine whether an object is proximately located with the electronic device 200. In one embodiment, this determination is whether the object is proximately located with a major face of the electronic device 200, such as the front major face of the electronic device 200 defined by the display 202 and front housing member 227 in FIG. 2. This determination can be made when the one or more processors 216 receive signals from the one or more proximity sensors 208 indicating that an object, such as the user's face, head, or ear, is proximately located with the major face of the electronic device 200. In one or more embodiments, the one or more processors 216 are further operable to determine a gravity direction relative to the electronic device 200. This can be done with the accelerometer 252 in one embodiment.

In one or more embodiments, the one or more processors 216 are further operable to determine an orientation of the electronic device 200 once a gesture lifting the electronic device 200 has been detected. For example, an illustrative gesture is the action of lifting the electronic device 200 from a first location, such as in the user's hand at waist or torso level to their ear. Testing has shown that it can be difficult distinguishing this motion from, for example, placing the electronic device 200 in a pocket. Accordingly, in one or more embodiments to confirm that a gesture lifting the electronic device 200 has occurred, embodiments of the disclosure confirm that at least a component of the direction of gravity runs from a first end 250 of the electronic device 200 to a second end 251 of the electronic device 200. Here, the first end 250 is the end with the earpiece speaker 241, while the second end 251 is the end with the microphone 240. Embodiments of the disclosure contemplate that if a user is holding the electronic device 200 adjacent to their head so as to hear the earpiece speaker 241 and speak into the microphone 240, the earpiece speaker 241 will be higher than the microphone 240. Accordingly, in one embodiment the one or more processors 216 check for this to detect a gesture lifting the electronic device 200 is occurring.

In one or more embodiments, the one or more processors 216 are operable to further, from information received from the accelerometer 252, determine an acceleration occurring during movement of the electronic device 200 by a user. This acceleration determination can be used in multiple ways. First, it can be used to confirm that the motion moving the electronic device 200 occurred against the direction of gravity, as would be the case when lifting the electronic device 200, but not when putting the electronic device 200 in a pocket. Second, by comparing the acceleration to a predetermined threshold, the acceleration can be used to confirm that a user is actually lifting the electronic device 200 rather than performing some other operation, such as waving the electronic device 200 around.

In one or more embodiments, the one or more processors 216 confirm that a gesture lifting the electronic device 200 occurs as a function of one or more factors. For example, in one embodiment the one or more processors 216 are to confirm that a gesture lifting the electronic device 200 occurs where the amount of movement exceeds a first predetermined threshold. In one embodiment, this first predetermined threshold is about 20 centimeters. The term "about" is used to refer to an amount that does not have to be absolute, but can include some tolerance. For example, 19.378 centimeters or 20.125 centimeters could be "about" 20 centimeters when including the tolerances of mechanical and electrical systems and sensors.

In one embodiment, the one or more processors 216 are further to confirm that a gesture lifting the electronic device 200 occurs where the amount of rotation of the electronic device 200 about the axis 254 exceeds a second predetermined threshold. In one embodiment, the second predetermined threshold is about forty-five degrees.

In one embodiment, the one or more processors 216 are further to confirm that a gesture lifting the electronic device 200 occurs where, at the end of a movement, an object is proximately located with a major face of the electronic device 200 as previously described. In one embodiment, the one or more processors 216 are further to confirm that a gesture lifting the electronic device 200 occurred where all or some of the amount of movement occurred against the direction of gravity. As noted above, this can help distinguish a lifting gesture from a gesture placing the electronic device 200 in a pocket.

In one embodiment, the one or more processors 216 are further to confirm the gesture lifting the electronic device 200 occurred when an acceleration of the electronic device 200 during the movement exceeds a third predetermined threshold. In one embodiment, this predetermined threshold is 0.5 meters per second squared, net of any acceleration due to gravity.

The factors listed above can be used in the function determining whether the gesture lifting the electronic device 200 occurred alone or in combination. For example, the function can consider one, two, three, or all of the factors. Considering more factors assists in preventing false detection of the gesture. Embodiments of the disclosure contemplate that a user should be minimally affected due to false detection. Accordingly, in one embodiment the one or more processors 216 consider all factors, namely, an amount of movement, an amount of rotation, whether an object is proximately located with a major face of the electronic device 200, a direction of gravity, whether the movement was against the direction of gravity, and what the final orientation of the electronic device 200 is after the movement occurs.

This is explained in further detail by an illustrative example. In one embodiment, a moving average of acceleration values, as measured by the accelerometer 252, and denoted $\alpha_{zero}$, is maintained in memory 218 by the one or more processors 216. For example, a moving average of 64 acceleration values can be maintained in one embodiment. At any one time, an instantaneous acceleration value can be measured by taking the square root of the sum of the instantaneous acceleration along the X-axis squared, the instantaneous acceleration along the Y-axis squared, and the instantaneous acceleration along the Z-axis squared in accordance with the following formula:

$$\alpha_{total} = \text{SQRT}(\alpha_x{^2} + \alpha_y{^2} - \alpha_z{^2}) \qquad \text{EQ. 1}$$

This value can be calculated at periodic intervals, such as five or ten times a second, with each value being added to the moving average number of values on a first-in-first-out basis.

At any one time, meaningful acceleration can be determined by subtracting the moving average acceleration value from an instantaneous acceleration value in accordance with the following formula:

$$\alpha_{current} = \alpha_{total} - \alpha_{zero} \qquad \text{EQ. 2}$$

Where this value, $\alpha_{current}$, is below a predetermined acceleration threshold, such as 0.5 meters per second squared, the one or more processors 216 can conclude that the electronic device 200 is not moving. Where this meaningful acceleration value is zero for a set number of predetermined cycles, concluded values for acceleration due to gravity, denoted $\Delta_{gravity}$, velocity of the electronic device 200, denoted $v_{current}$, distance traveled by the electronic device 200, denoted $d_{total}$, and rotation of the electronic device 200 about the axis 254, denoted $\Theta_{total}$, can all be set to zero in memory 218.

The difference between the running average of acceleration and the acceleration due to gravity can then be calculated to determine the effect of gravity. In one embodiment, this includes subtracting the acceleration due to gravity, i.e., 9.8 meters per second squared, from the running average of acceleration values and adding this to a historical calculation of the same subtraction in accordance with the following equation:

$$\Delta_{gravity} = \Delta_{gravity} + (\alpha_{zero} - 9.8 \text{ m/sec}^2) \quad \text{EQ. 3}$$

This provides a directionality to the movement that enables the one or more processors 216 to determine whether movement of the electronic device 200 is with or against gravity.

The current velocity of the electronic device 200 can be calculated with the following equation:

$$v_{current} = v_{current} + (\alpha_{current} * t_{samplerate}^2) \quad \text{EQ. 4}$$

The total distance that the electronic device 200 moves during a motion or gesture can be calculated with the following equation:

$$d^{total} = (v^{samplerate} * t^{samplerate}) + 0.5 * (\alpha^{current} * t^{samplerate}_2) \quad \text{EQ. 5}$$

This distance can also be measured directly when the motion detector 242 is a barometer 255. The use of a barometer 255 alleviates the need to perform a double integration to determine distance using EQ. 5.

The total rotation of the electronic device 200 about the axis 254 can be calculated with the following equation:

$$\Theta_{total} = \Theta^{total} + \Theta^{current} \quad \text{EQ. 6}$$

With these factors, in addition to input from the one or more proximity sensors 208, whether a gesture lifting the electronic device 200 has occurred can be confirmed. In one embodiment, if the one or more proximity sensors 208 indicate that an object is proximately located with a major face of the electronic device 200, but the object was not proximately located with a major face of the electronic device 200 during a previous proximity sensor detection cycle, the values d.sub.total, Θ.sup.total, and Δ.sub.gravity can be compared to their respective thresholds. In one embodiment, when all the thresholds have been exceeded, and the orientation of the electronic device 200 has the first end 250 above the second end 251, i.e., the bottom of the electronic device 200 is oriented no more than ninety degrees from perpendicular to the direction of gravity (down), the one or more processors 216 confirm that a gesture lifting the electronic device 200 has occurred. Accordingly, in one embodiment, the one or more processors 216 can perform a control operation in response to confirming the gesture lifting the electronic device 200 occurred. In one illustrative embodiment, the control operation includes transitioning a voice control interface engine into a discrete mode of operation. This will be shown in more detail in FIG. 3 below.

In one or more embodiments, the control module 245 of the electronic device 200 is a voice control interface engine. The voice control interface engine can include hardware, executable code, and speech monitor executable code in one embodiment. The voice control interface engine can include, stored in memory 218, basic speech models, trained speech models, or other modules that are used by the voice control interface engine to receive and identify voice commands. In one embodiment, the voice control interface engine can include a voice recognition engine. Regardless of the specific implementation utilized in the various embodiments, the voice control interface engine can access various speech models to identify speech commands.

In one embodiment, the voice control interface engine is configured to implement a voice control feature that allows a user to speak a specific trigger phrase, followed by a command, to cause the one or more processors 216 to execute an operation. For example, the user may say, as a trigger phrase, "Okay, Phone, Ready, now Go!" After this, the user may speak a command, such as "How tall is the Sears Tower?" This combination of trigger phrase and command can cause the one or more processors 216 to access an application module 247, such as a web browser, to search for the answer and then deliver the answer as audible output via an output component 243. For example, when operating in the first mode, the one or more processors 216 may deliver the answer as audible output through speaker port 232 at a first output level. When operating in the discrete mode, the one or more processors 216 may deliver the answer as audible output through the earpiece speaker 241 at a second, softer output level. In short, in one embodiment the voice control interface engine listens for voice commands, processes the commands and, in conjunction with the one or more processors 216, returns an audible output that is the result of the user's intent.

In one or more embodiments, the one or more processors 216 are operable to transition the voice control interface engine between the first mode and the second mode, or discrete mode, in response to detecting a predefined user input. In one embodiment, the predefined user input is a gesture input lifting the electronic device 200 as previously described.

In one or more embodiments, the voice control interface engine is operative in a first mode to receive a speech command through the microphone 240 from a first distance and, in response to the speech command, produce an audible output at a first output level. In one embodiment, this audible output is delivered to a user through speaker port 232.

The one or more processors 216 are then operable to detect the gesture lifting the electronic device 200. Where the one or more processors 216 detect such a predetermined characteristic, it can be used to control the voice control interface engine, and to toggle it between a first mode of operation and a second mode of operation.

When detection of the predefined user input occurs, in one embodiment the one or more processors 216 are operable to transition the voice control interface engine to a second mode of operation, which is the discreet mode in one embodiment. When operating in the discreet mode, the voice control interface engine is operable to receive speech commands from a second distance that is less than the first distance associated with the first mode. Further, the voice control interface engine can be operable to produce, in response to the received speech commands, an audible output at a second output level that is less than the first output level. In one embodiment, these softer output commands are delivered to a user through the earpiece speaker 241.

Advantageously, by delivering the predefined user input to cause the voice control interface engine to transition from the first mode to the discrete mode, the user can take advantage of voice controlled operation without third parties or eavesdroppers hearing the information delivered in the form of audible output. This solves the unforeseen problem illustrated in FIG. 1 where onlookers could overhear the audible response. Thus, if a user plans to listen to a voice mail that may be of a sensitive nature, the user simply delivers the predefined user input to the electronic device 200 to cause the one or more processors 216 to transition the voice control interface engine to the discreet mode of operation, as is illustrated in FIG. 3 below.

It is to be understood that the electronic device 200 and the architecture of FIG. 2 is provided for illustrative purposes only and for illustrating components of one electronic device 200 in accordance with embodiments of the disclosure, and is not intended to be a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Figure 3:
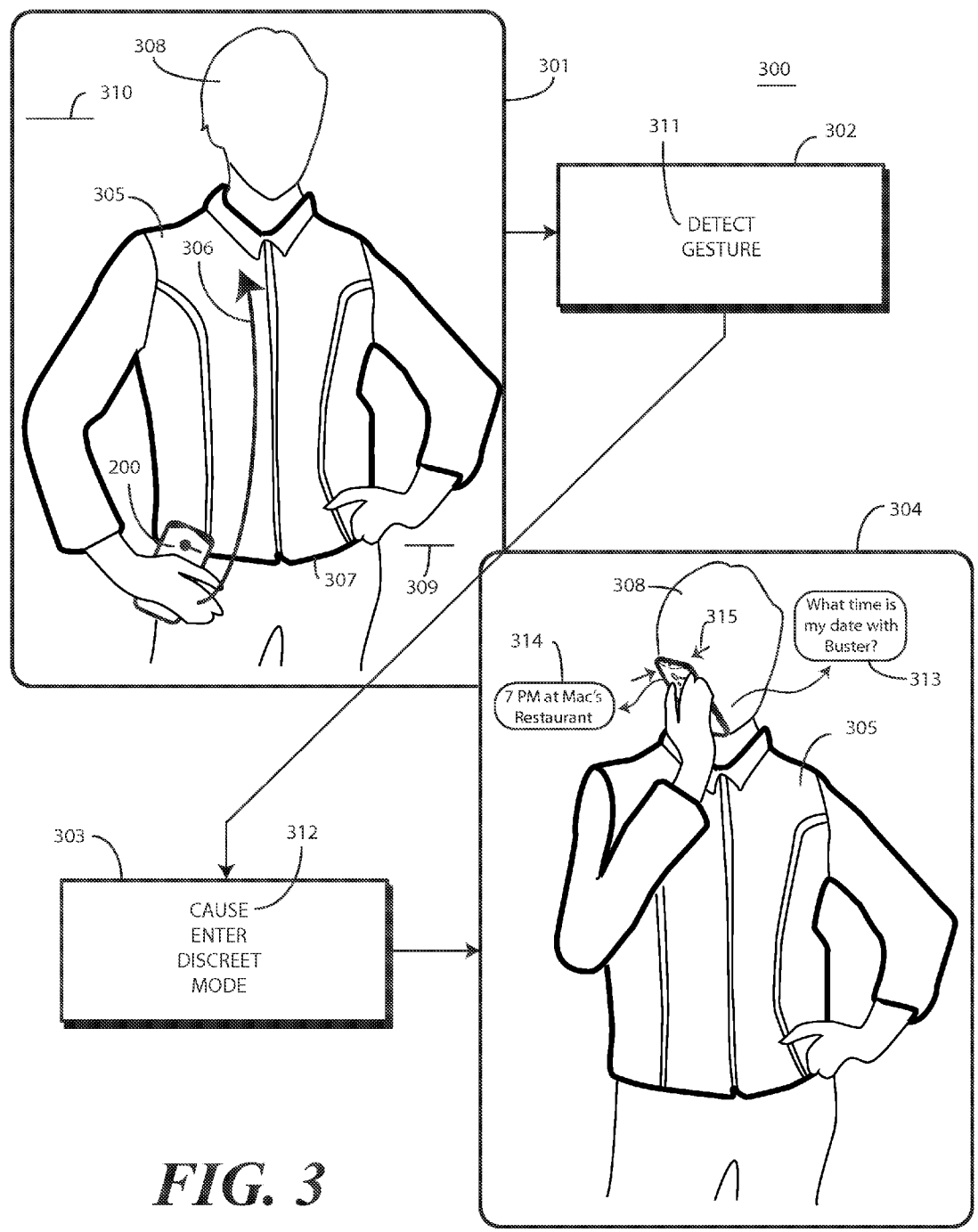
FIG. 3 illustrates one explanatory method in accordance with one or more embodiments of the disclosure.

Turning now to FIG. 3, illustrated therein is a method 300 of using an electronic device 200 in accordance with one or more embodiments of the disclosure. At step 301, a user 305 is shown holding the electronic device 200. At step 301, the electronic device 200 is operating in a default mode of operation, which is the first mode of operation where the voice control interface engine is operative to receive a speech command from a first distance and produce, in response to the speech command, an audible output at a first output level. Thus, the electronic device 200 would function exactly as the prior art electronic device (100) of FIG. 1 when operating in the first mode. The user 305 could deliver, in a normal conversational tone, a voice command asking, "How tall is the Sears Tower?" and the electronic device 200 would announce the answer with an audible output that the user 305 could hear several feet away.

However, in FIG. 3, the user 305 is interested in receiving personal information that she does not want third parties to hear. Additionally, she does not want third parties to see her manipulating her device to place it in a privacy mode, as this "tip" may pique the curiosity of these third parties, thereby making them want to listen in even more closely. Advantageously, embodiments of the disclosure allow the user 305 to make a simple gesture to cause the one or more processors (216) of the electronic device 200 to toggle modes of operation.

Accordingly, at step 301 the user delivers a predefined user input 306 by raising the electronic device 200 from her waist 307 to her head 308. Accordingly, the predefined user input 306 of this explanatory step 301 comprises lifting the electronic device 200 from a first elevation 309 to a second elevation 310, where the second elevation 310 is greater than the first elevation 309. The difference in elevation can be measured in several ways, including using EQ. 5 above or using a barometer (255) as the motion detector (242). Other techniques for measuring distance will be obvious to those of ordinary skill in the art having the benefit of this disclosure.

At step 302, the one or more processors (216) of the electronic device detect 311 the predefined user input 306 as previously described. At step 303, the one or more processors (216) cause 312 the control module (245), which is the voice control interface engine in this illustrative use case, to transition to a second mode. As shown at step 304, in the second mode the voice control interface engine is operative to receive the speech command 313 from a second distance and produce, in response to the speech command, the audible output 314 at a second output level. Here, the user 305 is asking, "What time is my date with Buster?" The audible output 314, which no eavesdroppers can hear due to its lower volume, says, "Seven PM at Mac's Restaurant."

In one embodiment, the second distance is less than the first distance of the first mode. Further, the second output level is less than the first output level. This is illustrated in the drawings by comparing FIG. 1 and FIG. 3. In FIG. 1, the user 100 is a first distance 104 from the prior art electronic device 100. In FIG. 3, the user 305 is a second distance 315 from the electronic device 200 that is less than the first distance (104). The second output level is indicated by the smaller text of the audible output 314 of FIG. 3 compared with the large text of the audible output (103) of FIG. 1.

Turning now to FIGS. 4-8, illustrated therein are various method steps for detecting the predefined user input (306) lifting the electronic device 200 as described above with reference to FIG. 2. In one embodiment, the method illustrated by the various steps of FIGS. 4-8 includes detecting, with one or more motion detectors (242), a gesture lifting the electronic device 200 as a function of at least a distance the electronic device 200 moves during a movement, an amount of rotation of the electronic device 200 about an axis, and whether an object is proximately located to a surface of the electronic device 200. The method can further include detecting the gesture as a function of whether at least some of the motion was against a gravity direction and an orientation of the electronic device 200 at an end of the motion. Once such a gesture is detected, in one embodiment one or more processors (216) of the electronic device 200 can perform a control operation in response to the gesture lifting the electronic device occurring.

Figure 4:
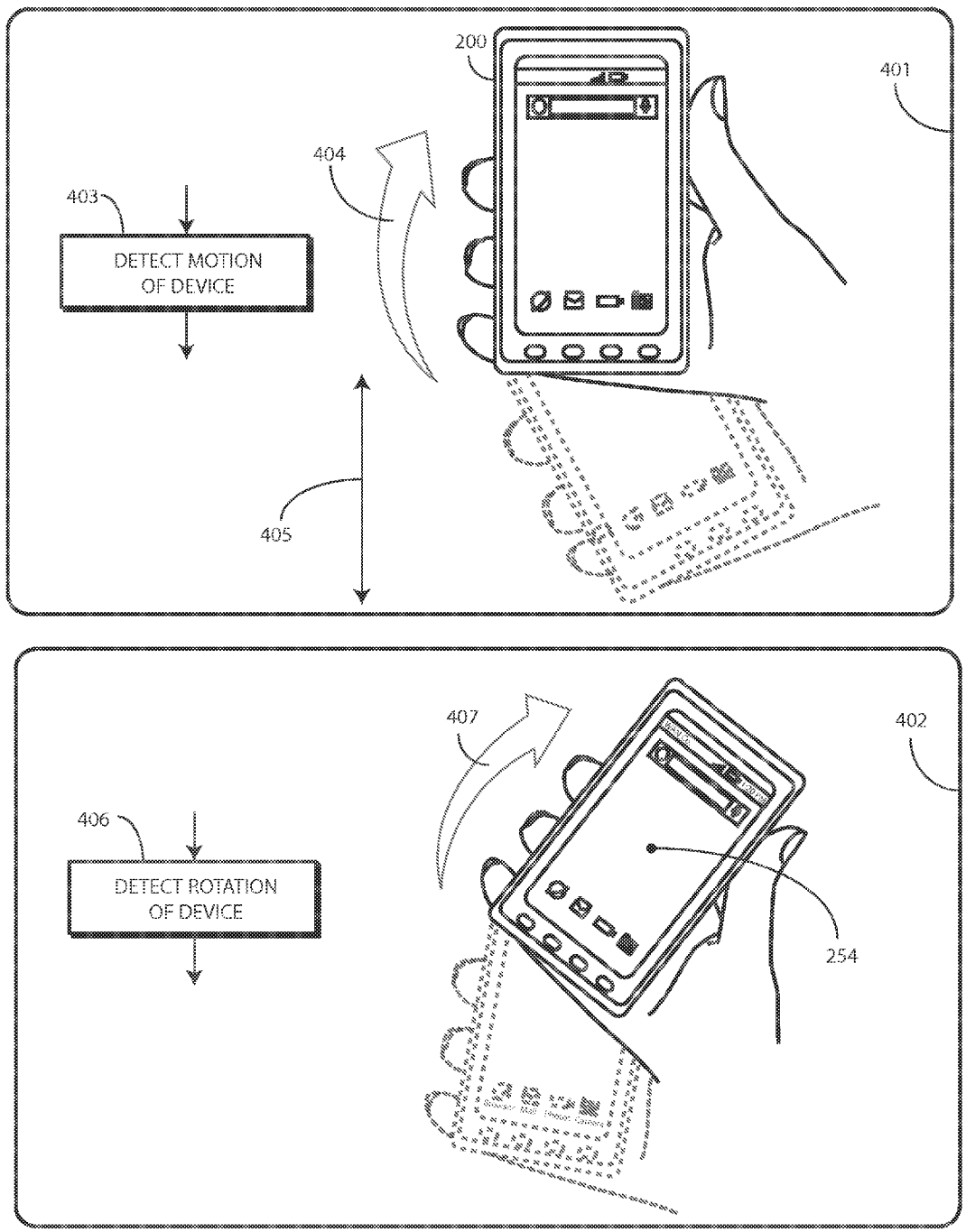
FIG. 4 illustrates one or more explanatory method steps for gesture detection in accordance with one or more embodiments of the disclosure.
Figure 5:
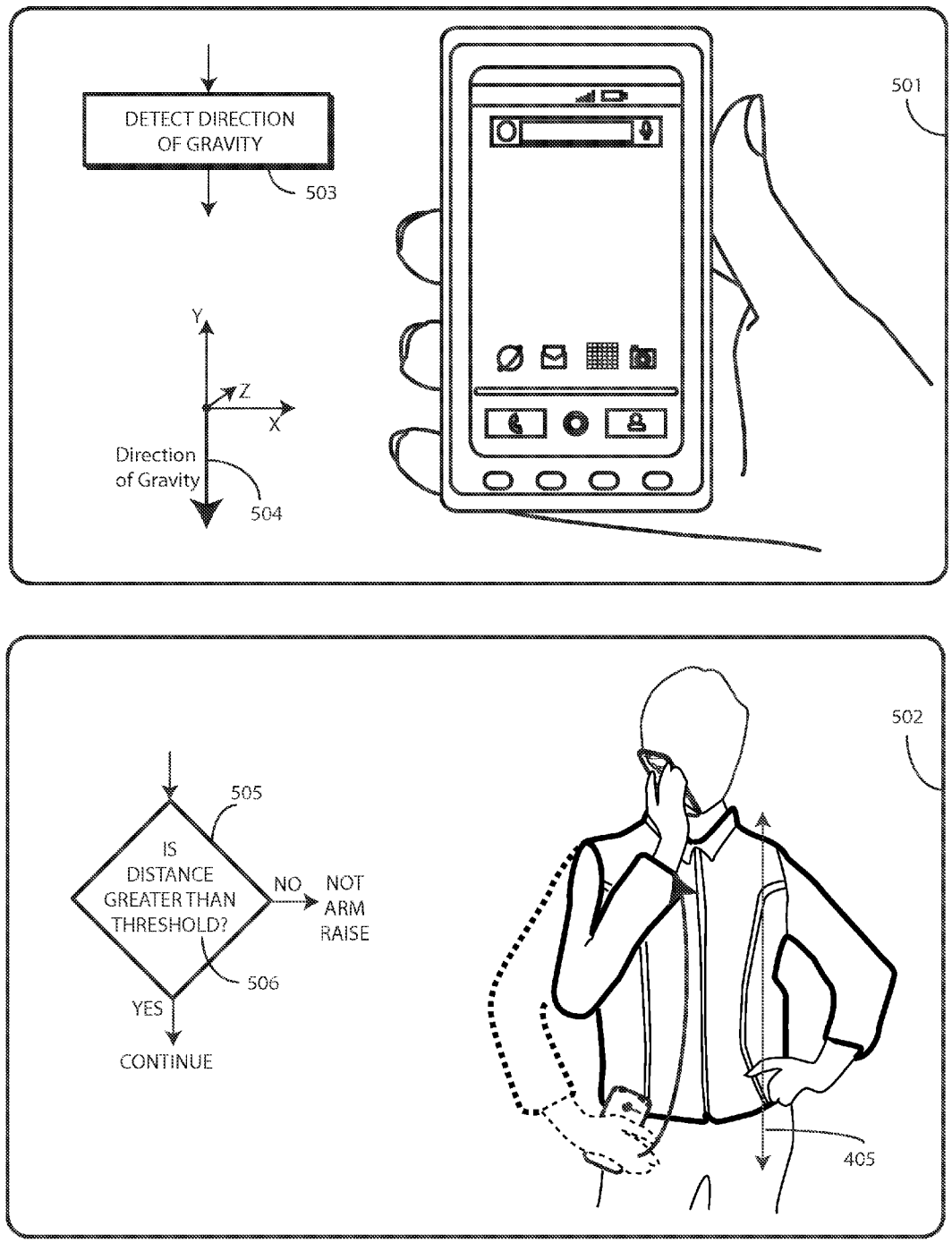
FIG. 5 illustrates one or more explanatory method steps for gesture detection in accordance with one or more embodiments of the disclosure.
Figure 6:
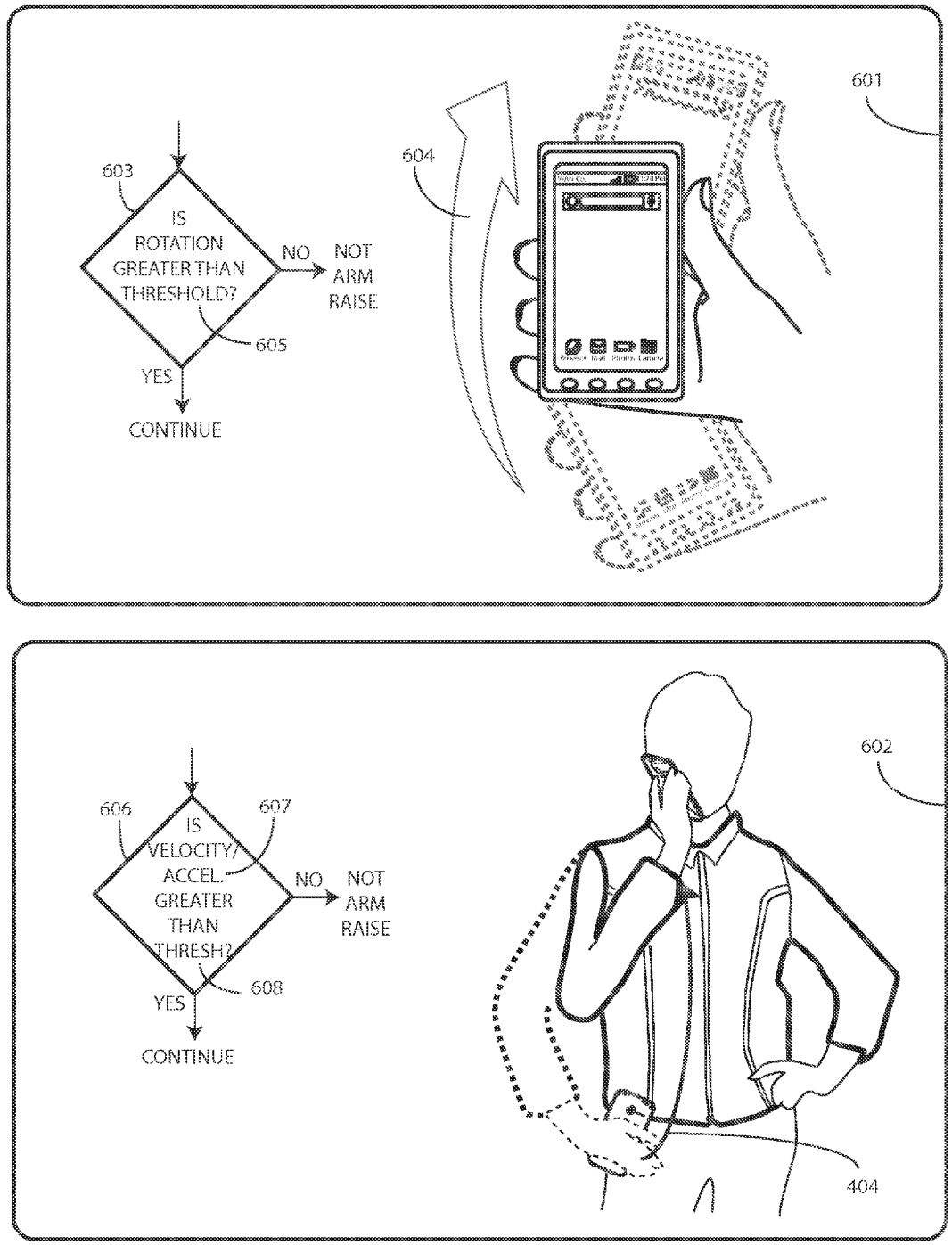
FIG. 6 illustrates one or more explanatory method steps for gesture detection in accordance with one or more embodiments of the disclosure.
Figure 7:
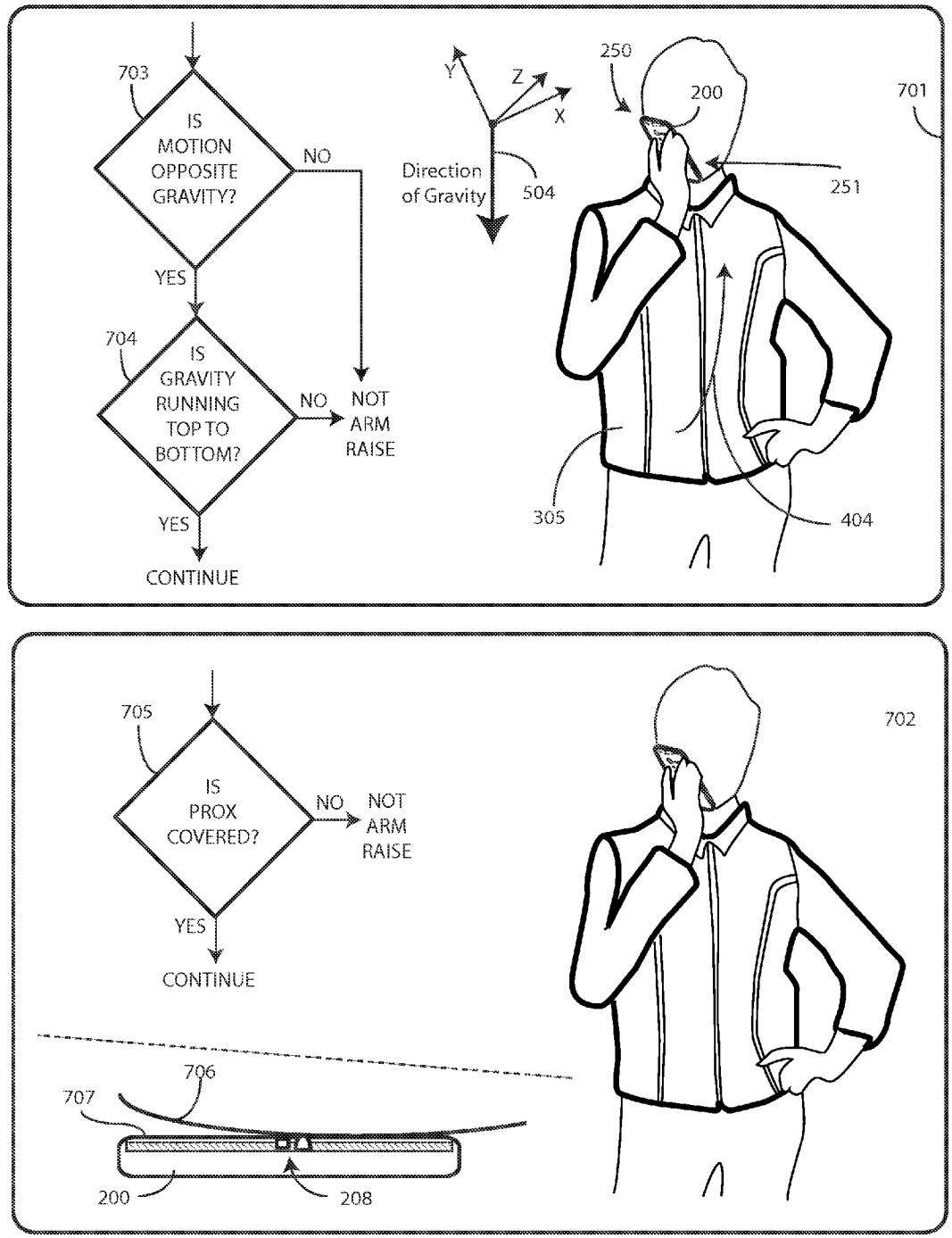
FIG. 7 illustrates one or more explanatory method steps for gesture detection in accordance with one or more embodiments of the disclosure.

Beginning with FIG. 4, at step 401, the one or more processors (216) of the electronic device 200 detect 403, with one or more motion detectors (242) of the electronic device 200, movement 404 of the electronic device 200. At this step 401, the one or more processors (216) can also detect a distance 405 the electronic device 200 travels during the movement 404. Acceleration of the movement 404 can be determined, as can velocity. At step 402, one or more processors (216) of the electronic device 200 detect 406 rotation 407 of the electronic device 200 about an axis 254 with one or more other sensors. As shown in FIG. 5, at step 501 the one or more processors (216) can detect 503, with a motion detector (242), a gravity direction 504.

Once these parameters have been measured, they can be compared with various thresholds. For example, at step 502, the one or more processors (216) can compare 505 the distance 405 with a predetermined distance threshold 506 to determine whether the distance 405 exceeds the predetermined distance threshold 506. In one embodiment, the predetermined distance threshold 506 is about twenty centimeters. Similarly, at step 601 of FIG. 6, the one or more processors (216) can compare the amount of rotation 604 to a predetermined rotation threshold 605 to determine whether the amount of rotation 604 exceeds the predetermined rotation threshold 605. In one embodiment, the predetermined rotation threshold 605 is about forty-five degrees.

At step 602, in one embodiment the one or more processors (216) can determine 606 whether acceleration 607 occurring during the movement 404 exceeded a predetermined acceleration threshold 608. In one embodiment, the predetermined acceleration threshold is about 0.5 meters per second square net of gravity.

Figure 8:
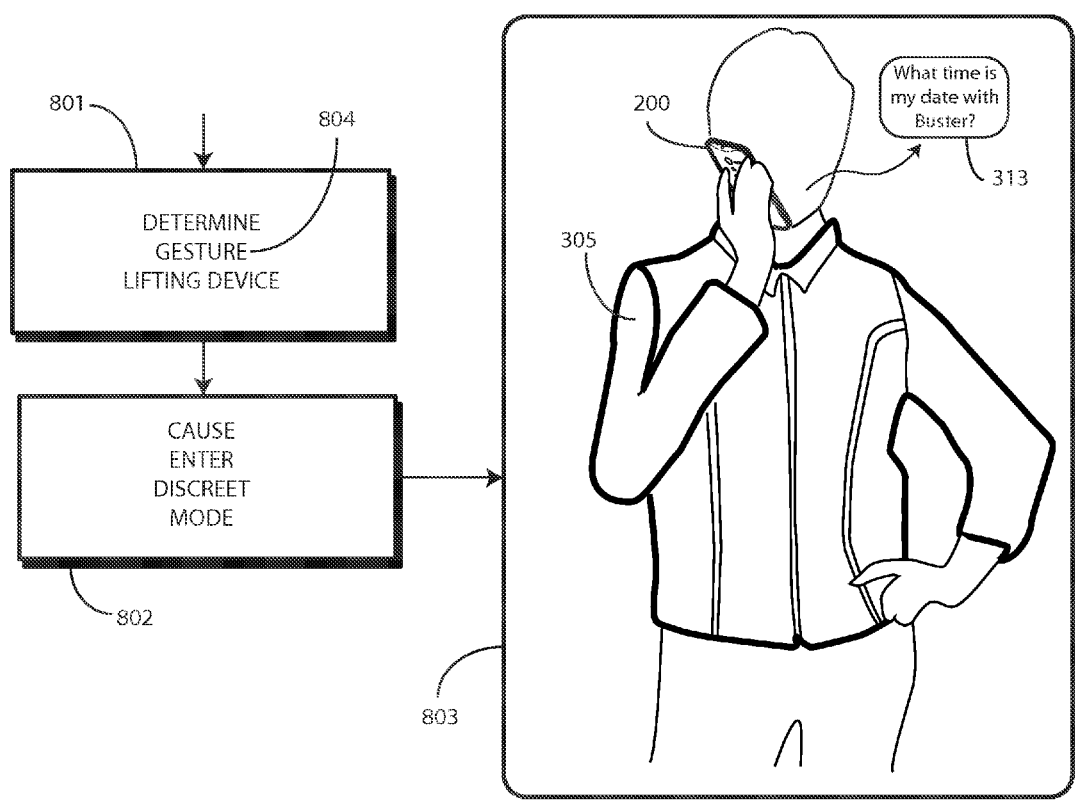
FIG. 8 one or more explanatory method steps for gesture detection in accordance with one or more embodiments of the disclosure.

At step 701, the one or more processors (216) can compare the movement 404 to the gravity direction 504. For example, in one embodiment the one or more processors can determine 703 whether at least some of the movement 404 was against the gravity direction 504. Similarly, in one embodiment the one or more processors (216) can determine 704 whether a component of the gravity direction 504 runs from a predefined first end 250 of the electronic device 200 to a predetermined second end 251 of the electronic device 200. As noted above, this step can ensure that the earpiece speaker (241) is above the microphone (240), which is indicative of the user 305 holding the electronic device 200 to their ear rather than placing it in a pocket. At step 702, the one or more processors (216) can determine 705 whether an object 706, such as the user's face, ear, or head, is proximately located with a major surface 707 of the electronic device 200.

Where this occurs, as shown in FIG. 8, the one or more processors (216) can confirm that a gesture 804 lifting the electronic device 200 has occurred. In one embodiment, in response to confirming the gesture 804 lifting the electronic device 200, the one or more processors (216) can cause 802 a control operation to occur. In one embodiment, the control operation comprises transitioning a voice control interface engine from a first mode of operation to a second mode of operation, as shown at step 803. The control operation can optionally include redirecting audible output 314 of the electronic device 200 to an earpiece speaker (241) of the electronic device 200 as well.

Figure 9:
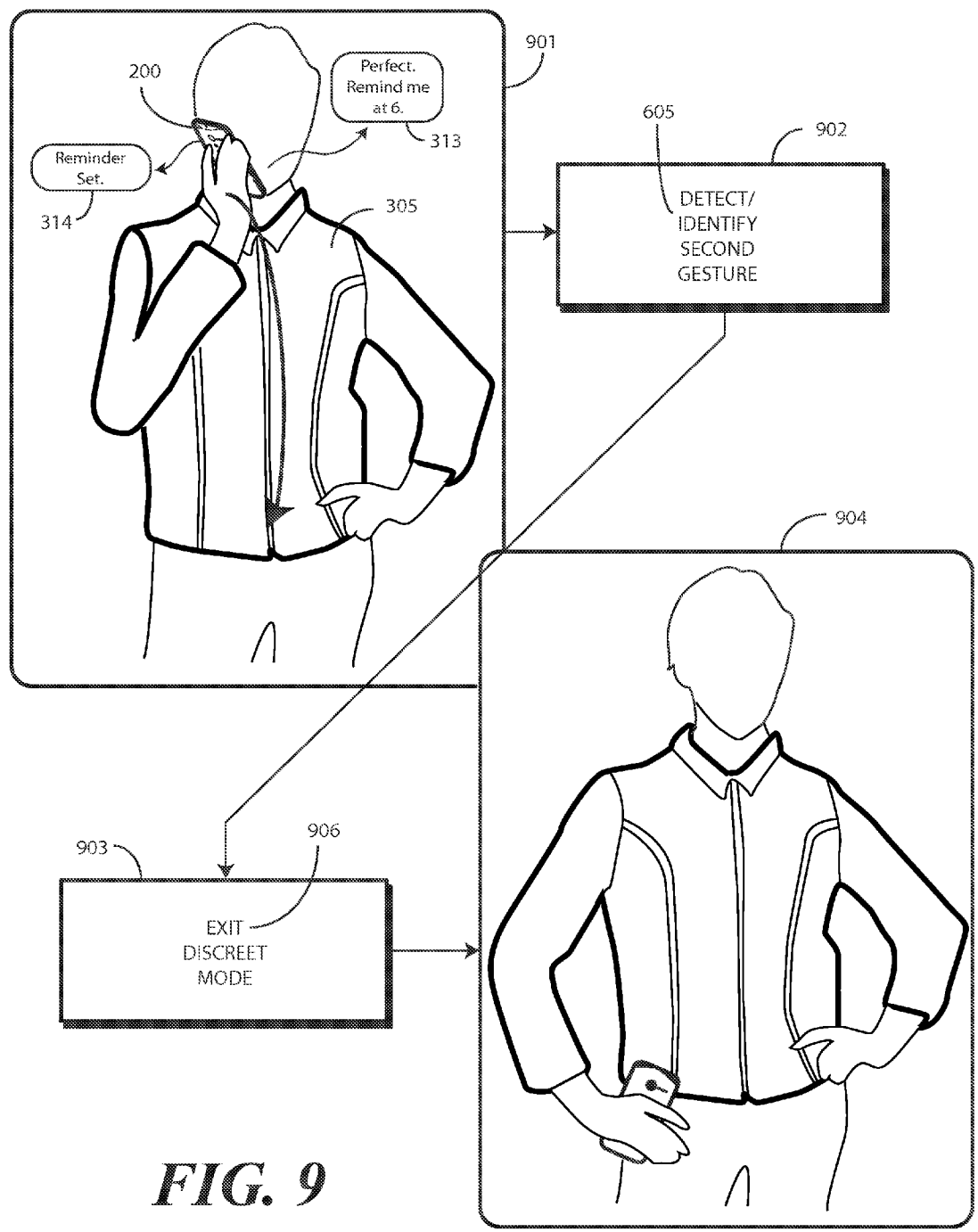
FIG. 9 illustrates another explanatory method in accordance with one or more embodiments of the disclosure.

Embodiments of the disclosure contemplate that the user 305 may want to reverse the process shown in FIGS. 4-8. Using the use case of mode transition in a voice control interface engine, embodiments of the disclosure contemplate that once the voice control interface engine is in the second mode, it can be desirable to transition the electronic device 200 back into the first mode of operation so that it can be used as shown in FIG. 1. Advantageously, embodiments of the disclosure provide a mechanism to do just that. Turning now to FIG. 9, illustrated therein is one such embodiment.

At step 901, the electronic device 200 is operating in the second mode, where speech commands 313 are received at a softer volume and audible responses are delivered at the second, softer output level. In this example, the user 305 is continuing the conversation from step (304) of FIG. 3, as the voice command is to remind the user of the date with Buster at 6 PM. The audible output 314 generated says, "Reminder set."

The user 305 is now done with the discrete mode of operation. Accordingly, in one embodiment, the user 305 can return the voice control interface engine to the first mode of operation when a predefined condition is identified. In FIG. 9, the predefined condition is a reverse motion 905 of the electronic device 200, which is identified 905 by one or both of the proximity sensors (208) and/or other sensors (209) at step 902. When this occurs, in one embodiment at step 903 the one or more processors (216) are operable to return 906 the voice control interface engine to the first mode of operation.

In other embodiments, the operation of FIGS. 4-8 can be performed in other ways. For example, the electronic device 200 can include a timer (246). Once user interaction is complete, e.g., when the user 305 is done delivering the speech command 313 at step 901, the one or more processors (216) can start the timer (246). When the timer (246) expires, the one or more processors (216) can return the voice control interface engine to the first mode of operation by identifying the expiration of the timer (246) as the predefined condition. Other predefined conditions will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for controlling an electronic device, comprising:
    detecting, with one or more motion sensors, a gesture lifting the electronic device as a function of at least:
        movement of the electronic device exceeding a predetermined distance threshold, the predetermined distance threshold at least twenty centimeters;
        rotation of the electronic device about an axis exceeding a predetermined rotation threshold, the predetermined rotation threshold at least forty-five degrees; and
        whether an object, not proximately located to a surface of the electronic device prior to the gesture, is proximately located to the surface at an end of the movement; and
    performing, by one or more processors operable with the one or more motion sensors, a control operation in response to the gesture lifting the electronic device occurring, the control operation comprising transitioning a voice control interface engine from a first mode of operation to a second mode of operation.

2. The method of claim 1, further comprising:
    detecting, with a motion sensor, the movement of the electronic device;
    determining, with the one or more processors, a distance the electronic device moves during the movement;
    detecting, with another motion sensor operable with the one or more processors, the rotation of the electronic device about the axis;
    determining, with the one or more processors, an amount of rotation of the electronic device about the axis;
    detecting, with one or more proximity sensors operable with the one or more processors, the object being proximately located with the electronic device; and
    determining, with the one or more processors when the object is proximately located with the electronic device, the gesture lifting the electronic device has occurred by confirming both the distance exceeds the predetermined distance threshold and the amount of rotation exceeds the predetermined rotation threshold.

3. The method of claim 2, the function further of at least:
    whether at least some of the motion was against a gravity direction; and
    an orientation of the electronic device at an end of the motion.

4. The method of claim 3, further comprising detecting, by the motion sensor, the gravity direction, and the determining the gesture lifting the device has occurred further comprising confirming that at least some of the movement was against the gravity direction.

5. The method of claim 4, the determining the gesture lifting the device has occurred further comprising confirming that a component of the gravity direction runs from a predefined first end of the electronic device to a predefined second end of the electronic device.

6. The method of claim 5, the predefined first end comprising an earpiece speaker, the predefined second end comprising a microphone.

7. The method of claim 3, further comprising determining, with the motion sensor, an acceleration occurring during the movement, the determining the gesture lifting the device has occurred further comprising confirming the acceleration exceeds a predetermined acceleration threshold.

8. The method of claim 7, the predetermined acceleration threshold at least 0.5 meters per second squared.

9. The method of claim 1, the first mode of operation comprising operating a loudspeaker.

10. The method of claim 1, the second mode of operation comprising operating an earpiece speaker.

11. The method of claim 1, the first mode comprising operating a microphone at a first gain sensitivity, the second mode comprising operating the microphone at the second gain sensitivity.

12. The method of claim 1, further comprising redirecting audible output of the electronic device to an earpiece loudspeaker of the electronic device.

13. An apparatus comprising:
one or more processors;
a motion detector, operable with the one or more processors;
another motion detector, operable with the one or more processors; and
one or more proximity detectors operable with the one or more processors;
the one or more processors to determine:
movement of the apparatus from the motion detector;
determine rotation of the apparatus about an axis from the another motion detector; and
whether an object is proximately located with the apparatus from the one or more proximity detectors at an end of the movement and the rotation;
the one or more processors to confirm a gesture lifting the apparatus occurred when:
the movement exceeds a first predetermined threshold, the first predetermined threshold is about twenty centimeters;
the rotation exceeds a second predetermined threshold, the second predetermined threshold is about forty-five degrees; and
the object is proximately located with the apparatus;
the one or more processors to perform a control operation in response to confirming the gesture lifting the apparatus occurred, the control operation comprising transitioning a voice control interface engine into a discrete mode of operation.

14. The apparatus of claim 13, the motion detector comprising an accelerometer, the another motion detector comprising a gyroscope.

15. The apparatus of claim 13, the motion detector and the another motion detector comprising a common accelerometer.

16. The apparatus of claim 13, the one or more processors to further determine a gravity direction from the motion detector and to further confirm the gesture lifting the apparatus occurred when some or all of the movement occurred against the gravity direction.

17. The apparatus of claim 16, the apparatus comprising an electronic device having an earpiece speaker at a first end and a microphone at a second end, the one or more processors to further confirm the gesture lifting the apparatus occurred when a component of the gravity direction is oriented from the first end toward the second end.

18. The apparatus of claim 17, the one or more processors to further determine an acceleration occurring during the movement and to further confirm the gesture lifting the apparatus occurred when the acceleration exceeds a third predetermined threshold.

19. The apparatus of claim 18, wherein the third predetermined threshold is about 0.5 meters per second squared.

20. The apparatus of claim 13, the discrete mode of operation comprising operating reducing a distance at which audible output from a speaker can be heard.

* * * * *